United States Patent [19]
Kienow et al.

[11] 4,174,089
[45] Nov. 13, 1979

[54] MOLD FOR FIRING BODIES OF SILICA- OR ALUMINA-CONTAINING GRANULES

[75] Inventors: Sigismund Kienow, Wiesbaden; Karl Briem, Braunschweig, both of Fed. Rep. of Germany

[73] Assignee: Zytan Thermochemische Verfahrenstechnik GmbH & Co. Kommanditgesellschaft, Braunschweig, Fed. Rep. of Germany

[21] Appl. No.: 875,863

[22] Filed: Feb. 7, 1978

[30] Foreign Application Priority Data

Feb. 8, 1977 [DE] Fed. Rep. of Germany ....... 2705121

[51] Int. Cl.² .......................... B28B 7/34; B28B 7/36
[52] U.S. Cl. ..................................... 249/80; 249/111; 249/112; 249/115; 249/134; 425/4 R
[58] Field of Search ............... 249/111, 112, 115, 134, 249/160, 163, 80; 264/337, 338; 106/38.22, 38.27; 427/133; 425/4

[56] References Cited

U.S. PATENT DOCUMENTS

| | | | |
|---|---|---|---|
| 600,565 | 3/1898 | Wallace | 249/112 |
| 1,634,999 | 7/1927 | Krause | 249/111 |
| 3,666,531 | 5/1972 | Cocks | 106/38.22 |
| 3,811,815 | 5/1974 | Sundermann et al. | 425/446 |
| 4,050,865 | 9/1977 | Drostholm et al. | 249/112 |

*Primary Examiner*—John McQuade
*Attorney, Agent, or Firm*—Montague & Ross

[57] ABSTRACT

Silica- or alumina-containing granules are loaded into a mold of which the inner walls at least are formed of a nonbonding material constituted of ferrochromite, magnesiochromite, calciochromite, or trivalent-chromium oxide. The mass is then heated to a temperature above the softening point of the granules so as to fuse them together and thereafter the heated mass is hardened. As the mass can inherently not bond to the lining of the mold subsequent separation is relatively easy.

8 Claims, 13 Drawing Figures

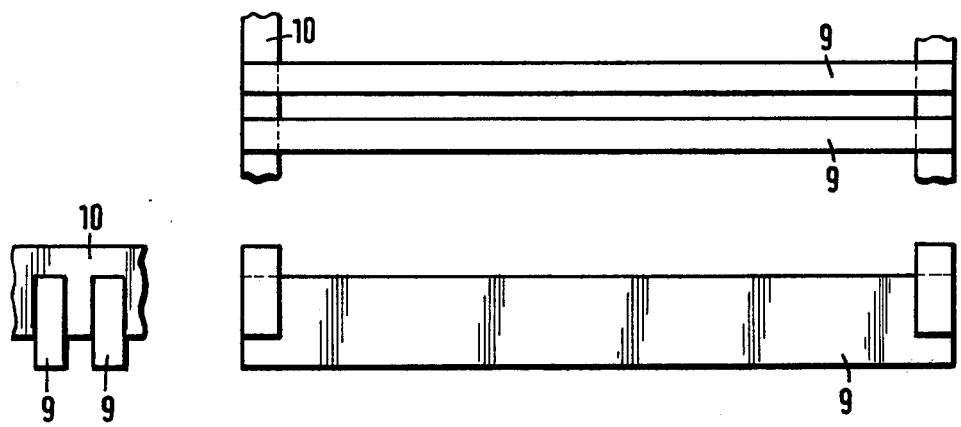
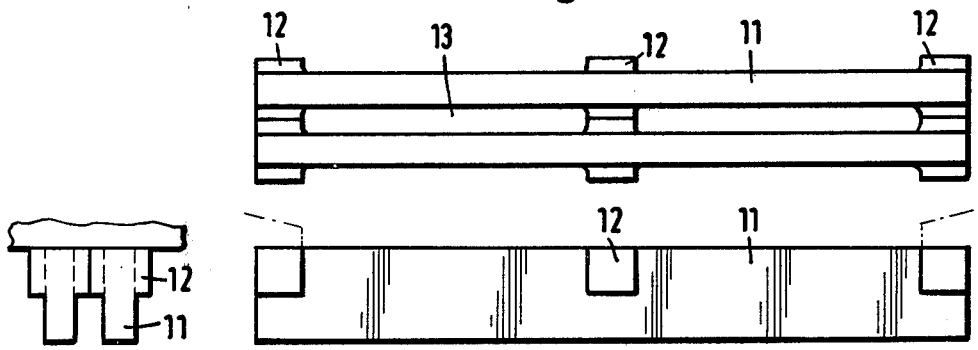

MOLD FOR FIRING BODIES OF SILICA- OR ALUMINA-CONTAINING GRANULES

FIELD OF THE INVENTION

The present invention relates to the firing of a body of a silica- or alumina-containing material. More particularly this invention concerns a mold usable in the firing of such material.

BACKGROUND OF THE INVENTION

In order to form refractory brick or like material it is necessary to fire shaped masses of granular ceramic material containing alumina and silica. These materials are naturally porous and expansible and are normally found naturally as the minerals diatomite, lavalite, expanded clay, glauconite, pearlite, and the like. Such blocks or bricks are formed by first imparting to the mass of granules of such material the desired shape, then firing the shaped masses to a temperature above the softening point of the material in an oxidizing or reducing atmosphere, normally by passing hot gas over the shaped masses. Thereafter the fired masses are cooled.

A considerable problem with this method is that the fired bricks or blocks stick very tightly to the support on which they stand while being fired. German Pat. No. 1,914,372 has suggested that this can be overcome by coating the mold in which the brick is formed with a powder, for example of sinterable clay, that fuses at a temperature much higher than that of the alumina- or silica-containing material being made into the bricks. Thus this lining powder keeps the material being fired out of direct contact with the mold so that subsequent separation is relatively easy. This system has the considerable disadvantage that the lining powder is relatively expensive, and that it is necessary to hold the mass being shaped in the lining until it is completely cooled. It is not possible to demold the object until it is relatively cool.

It has also been suggested to form the mold of metal alloys capable of resisting the extremely high heat employed during firing of the alumina- and silica-containing material. Since such alloys have an altogether different coefficient of thermal expansion from that of the material being shaped, it is not extremely difficult to demold the objects later. Nonetheless some material will inherently remain stuck in the mold so that eventually it will have to be chipped out or the expensive mold will have to be discarded. Furthermore it is necessary to separate the molded body from the mold at temperatures several hundred °C. below the firing temperature so that considerable energy is wasted and substantial thermal stresses are applied to the mold.

It is also known to line the firing mold with a nonoxide ceramic such as boron nitride, silicon nitride, and the like. Such materials can, however, only be used in a reducing firing atmosphere as they are destroyed above 1000° C. by oxygen. In addition these ceramics are extremely expensive so that they cannot be used in any practical application. In experimental use they have shown that the use of silicon nitride on the surface of the mold forms a passivating silicon oxide layer which can be scraped off by the material being fired so that even in experimental use the material is quickly used up.

OBJECTS OF THE INVENTION

It is therefore an object of the present invention to provide an improved mold for firing a body of silica- or alumina-containing material.

Yet a further object is to provide an improved firing system for such material which can be practically used at relatively small expense and wherein demolding of the fired bodies is no problem.

SUMMARY OF THE INVENTION

These objects are attained according to the present invention in a method of forming a body of silica- or alumina-containing material which comprises the steps of forming a shaped mass of particles of the material, supporting the shaped mass on a surface consisting of ferrochromite, magnesiochromite, calciochromite, or trivalent-chromium oxide, heating the shaped mass while thus supported to fuse the particlees together, finally cooling the heated mass. It has surprisingly been found that the above-listed chromium-containing materials do not bond to silica- or alumina-containing material. Thus if the shaped mass is supported on a surface constituted on such nonbonding material it will not adhere thereto and, once fired, can be completely and easily separated therefrom.

It has surprisingly been discovered that trivalent-chromium oxide and magnesiochromite can be used both with oxidizing and reducing atmospheres as long as the firing temperature does not exceed approximately 1250° C. When the material being fired is pure or has a slight content of alkali, iron oxide, lime, or magnesia, the reaction temperature for trivalent-chromium oxide is even higher. Even with the higher temperatures the material does not bond to the nonbonding materials. Thus it is possible in a very simple and easy manner to demold the body after firing, and the mold or support surface can be re-used many times so that even if it itself comprises a relatively expensive unit it will have a very long service life and will therefore amortize itself in a cost-efficient manner.

It has also been found that calciochromite can only be used with reducing firing atmospheres. When the alkali or iron-oxide content of the material being fired is relatively high it is advantageous to form or line the mold with magnesiochromite, as trivalent-chromium oxide combines with alkalis to form alkalichromates having a low melting point. Magnesiochromite in a reducing atmosphere is more resistant to iron oxide than pure trivalent-chromium oxide.

According to further features of this invention the mold is formed of a floor and a side wall. The floor is constituted entirely of the above-mentioned nonbonding materials and the side wall is provided with an internal lining constituted constituted by such materials. Furthermore the floor is foraminous, that is gas-pervious, so that a firing gas can be forced vertically through the mold and through the gas-pervious body of granules therein. The outer walls of the mold, those portions that do not come in contact with the material being fired, are formed in accordance with this invention of silicon carbide. U-clamps formed of the nonbonding material secure the lining constituting the inner wall portions of nonbonding material to the outer wall portion of silicon carbide.

In accordance with the present invention it is possible to minimize the use of the relatively costly chromium-containing nonbonding material by merely employing a thin lining of it in the mold. Efficiency can be considerably increased by providing a layer of insulating material, such as aluminum-silicate fibers, between the lining and the rest of the side wall of the mold. It is also possible to provide a free air space through which cooling air may circulate.

It is to be understood that the elements described above as consisting of the nonbonding material—ferrochromite, magnesiochromite, calciochromite, or trivalent-chromium oxide—may also of course contain a minor portion of impurities.

BRIEF DESCRIPTION OF THE DRAWING

FIGS. 3a, 3a' and 3a'' are bottom, side, and end views of a detail of another mold floor according to this invention;

FIGS. 3b, 3b' and 3b'' are views respectively similar to FIGS. 3a, 3a' and 3a'' showing another type of mold floor according to this invention;

SPECIFIC DESCRIPTION

Figure 1:
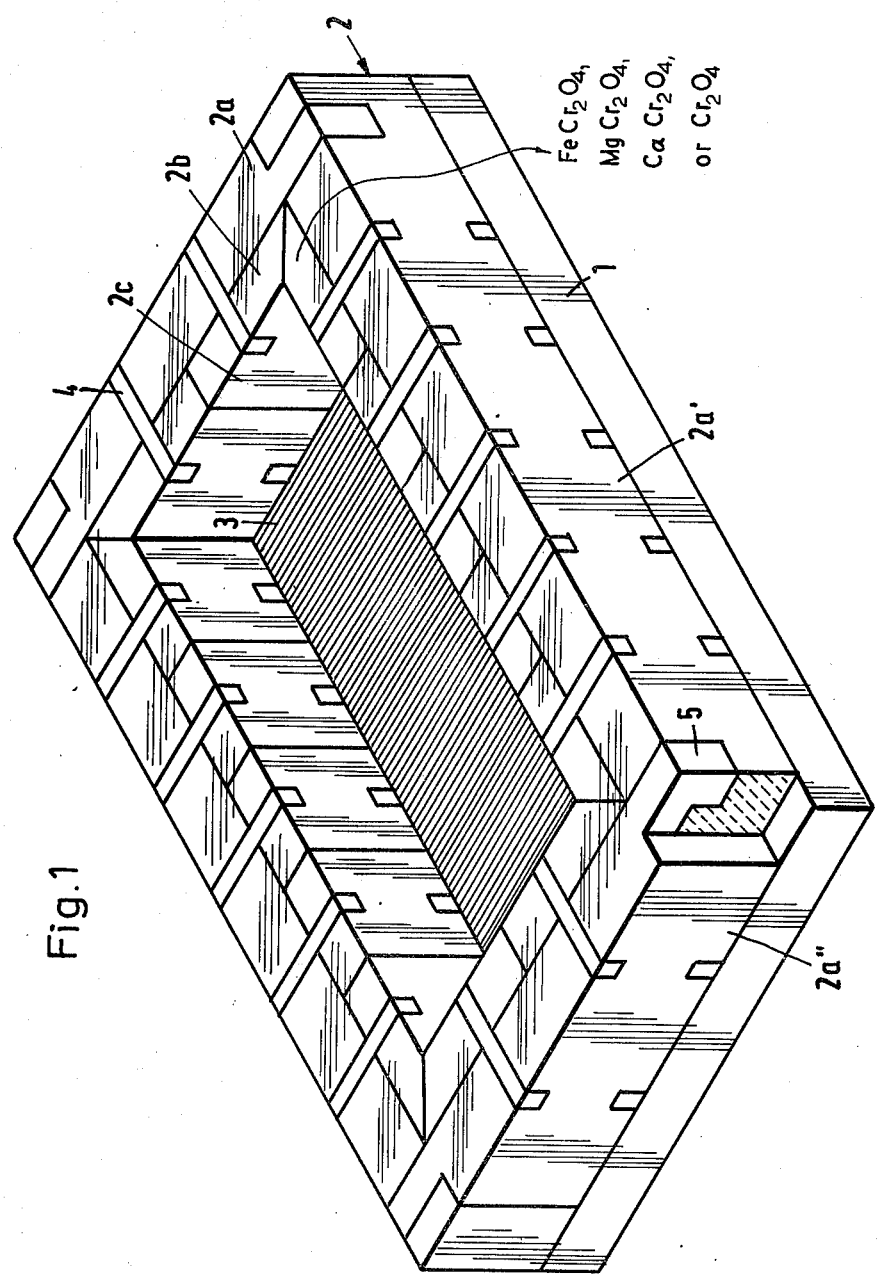
FIG. 1 is a perspective view of a mold according to the instant invention.
Figure 4:
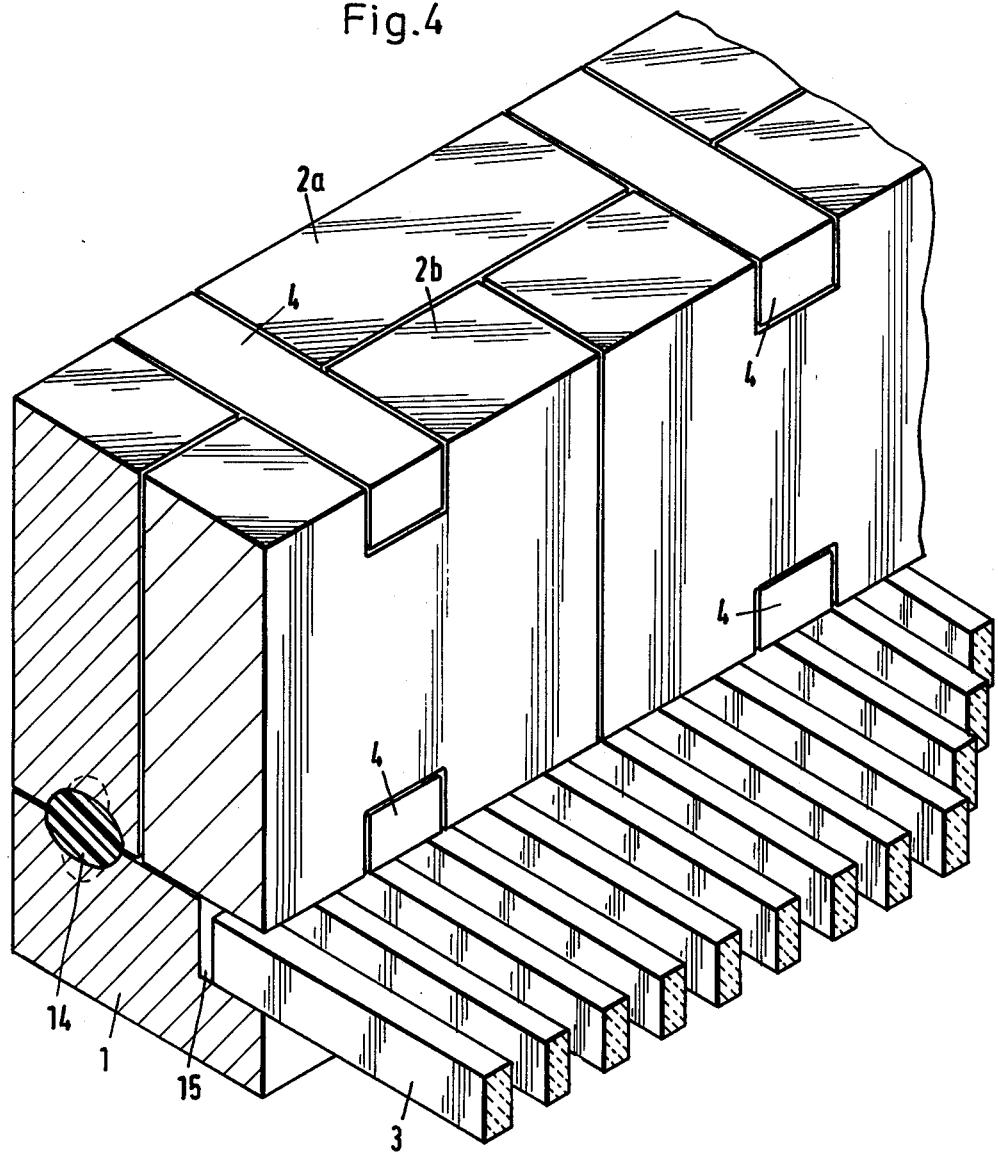
FIG. 4 is a large-scale sectional and perspective view of a detail of a mold according to this invention.

As shown in FIGS. 1 and 4 a mass of granules of silica- or alumina-containing material can be formed in a mold generally having a lower support frame 1 from which upwardly extends a side wall 2 of generally rectangular shape. A grid of parallel spaced-apart bars 3 constitutes the floor of the mold, with the spacing between the bars 3 being smaller than the mesh size of the granules to be fired.

The side wall 2 is formed generally of an outer wall 2a of silicon carbide and an inner wall 2b of nonbonding material. U-shaped clips 4 secure the blocks of nonbonding material forming the inner wall 2b to the outer wall 2a. The bars forming the grid 3, the blocks forming the inner wall 2b, and the clips 4 are all formed of ferrochromite, magnesiochromite, calciochromite, or trivalent-chromium oxide, with of course some impurities.

The outer wall 2a is formed by relatively long longitudinally extending bars 2a' and relatively short transverse bars 2a''. These latter bars 2a'' are formed at their ends with hooks 5 that engage in correspondingly and complementarily shaped recesses in the longitudinal bars 2a'.

The frame 1, which is also formed of silicon carbide, is formed with an upwardly open peripheral internal groove 15 in which rest the outer ends of the bars constituting the grid 3. In addition an insulating strip 14 is fitted into complementary grooves in the outer wall 2a and the frame 1.

Figure 2:
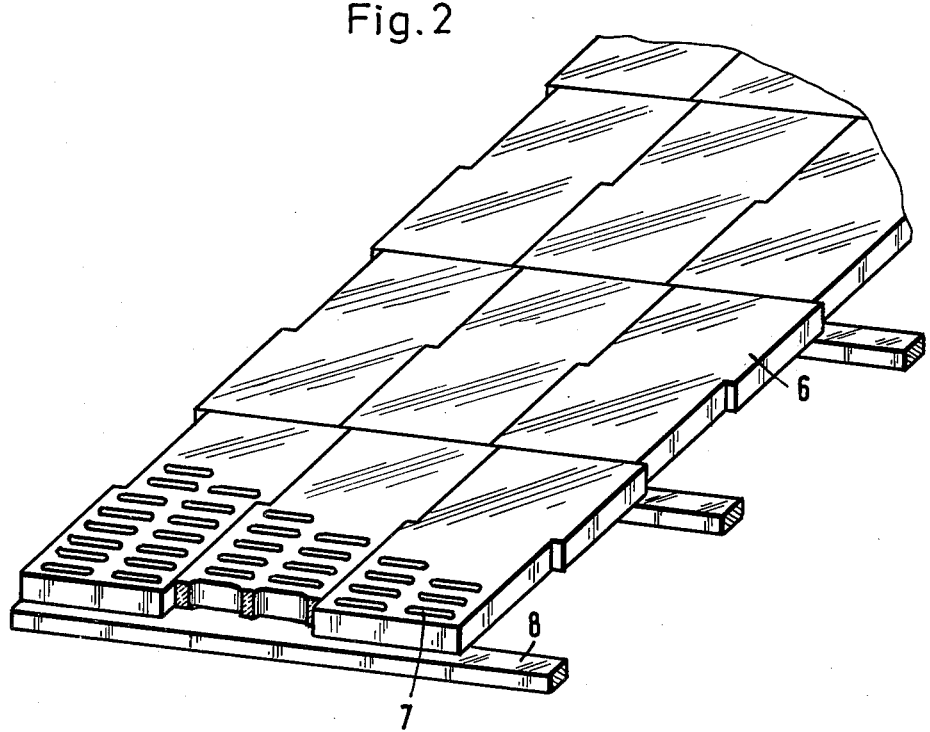
FIG. 2 is a perspective view showing a mold floor in accordance with this invention.

It is also possible as shown in FIG. 2 to form the floor of interfitting puzzle-like blocks 6 having throughgoing perforations 7 and resting on heat-resistant bars 8.

FIGS. 3a, 3a', and 3a'' show how the floor of the mold can be constituted by bars 9 of nonbonding material set into notches in end elements 10 that extend perpendicular to these bars 9. The notches in the end elements 10 are not as deep as the bars 9 so that they project somewhat therebeyond.

FIGS. 3b, 3b' and 3b'' show how bars 11 having lateral spacer bumps 12 define spaces 13 through which hot gas may be passed upwardly during firing of material resting on them. These bumps 12 are of square shape and are only provided adjacent one longitudinal horizontal edge of the bars 11.

Figure 5:
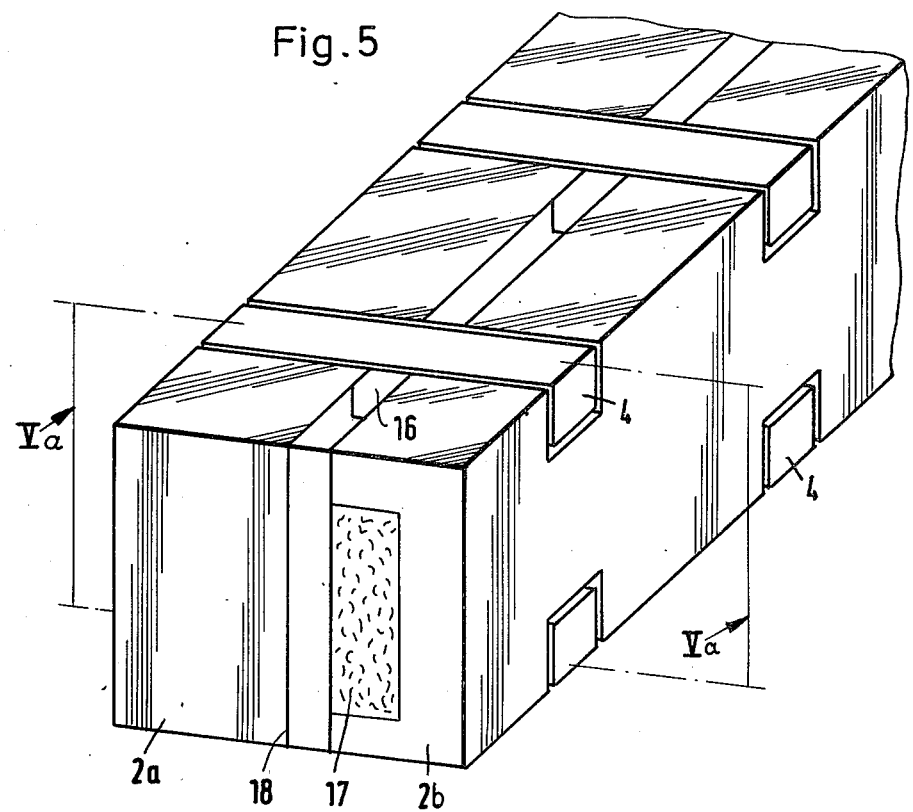
FIG. 5 is a large-scale perspective view of a detail of another mold according to this invention.
Figure 5A:
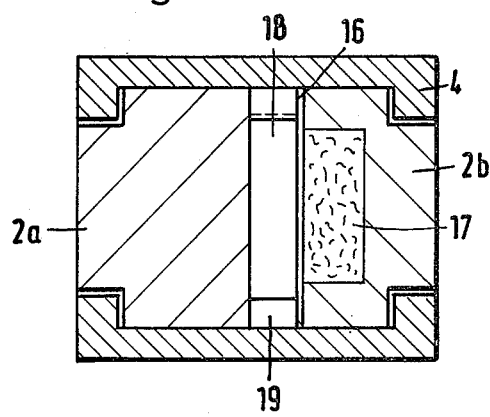
FIG. 5a is a section taken along the line Va—Va of FIG. 5.

FIG. 5 shows how a succession of blocks of insulating material 16 may be provided between the outer wall 2a and inner wall 2b, with clips 4 holding the assembly together. This layer of insulating material 16 is constituted by a mat of aluminum-silicate fibers. Furthermore as shown in FIG. 5a it is possible to provide an insulating mass 17 extending along inside the blocks forming the inner wall 2b. In addition spacers 19 may be provided between the inner and outer walls 2b and 2a to form an air space 18 through which cooling air may circulate.

Figure 6:
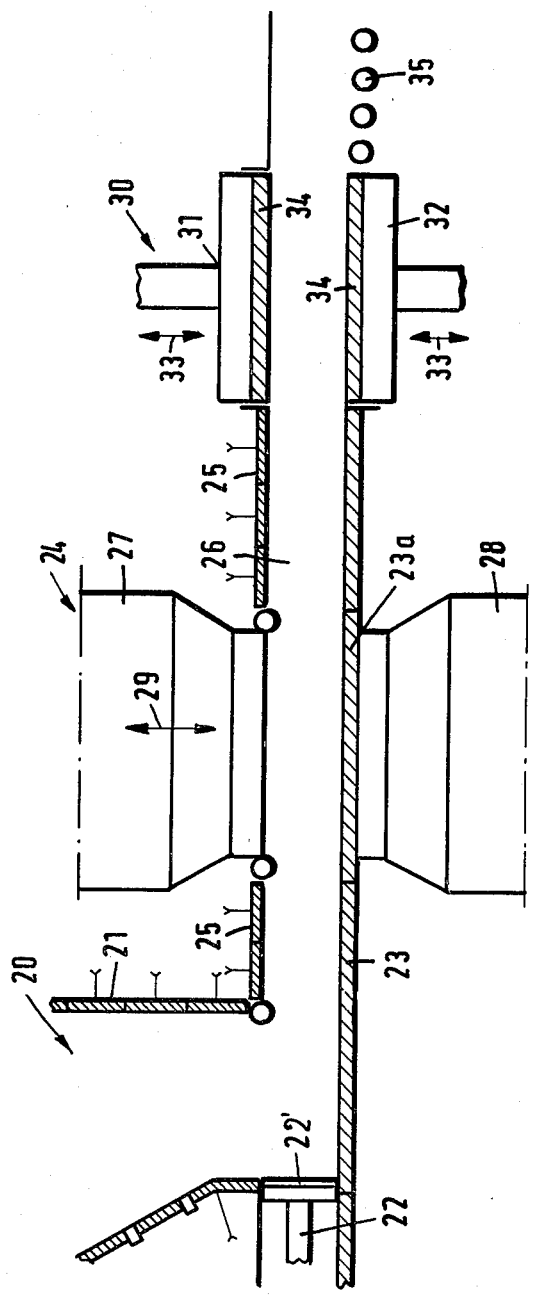
FIGS. 6 and 7 are largely schematic views illustrating the firing of alumina- or silica-containing material according to this invention.

FIG. 6 shows a system for continuously forming blocks of granules of alumina- or silica-containing material. The material enters via a chute or funnel 21 in a dosing or filling station 20. The walls of this funnel 21 are lined with the above-described nonbonding material. A periodically reciprocating piston 22 faced at 22' with nonbonding material serves to push quantities of this mass along a passageway 26 defined between lower and upper walls 23 and 25, respectively, whose inner surfaces at least are formed of nonbonding material. At a firing station 24 the material rests on a surface 23a of nonbonding material and very hot gas is passed between upper and lower firing chambers 27 and 28 in either of the directions indicated by arrow 29 through the mass resting on the foraminous surface 23a.

After being fired the material is pushed through chute 21 by the piston 22 through trailing blocks of material, until it comes between a pair of press plates 31 and 32 at a pressing station 30. These plates 31 and 32 have faces 34 of nonbonding material and are displaceable in the directions indicated by arrows 33. At this station the material expands and at the same time is acted on by the pressing plates 31 and 32. Finally the material passes away over a roller conveyor 35 at a relatively low temperature to a cooling station or through a cooling tunnel.

In the arrangement of FIG. 6 any surface that comes in contact with the hot silica- or alumina-containing material is of the above-described nonbonding material.

Figure 7:
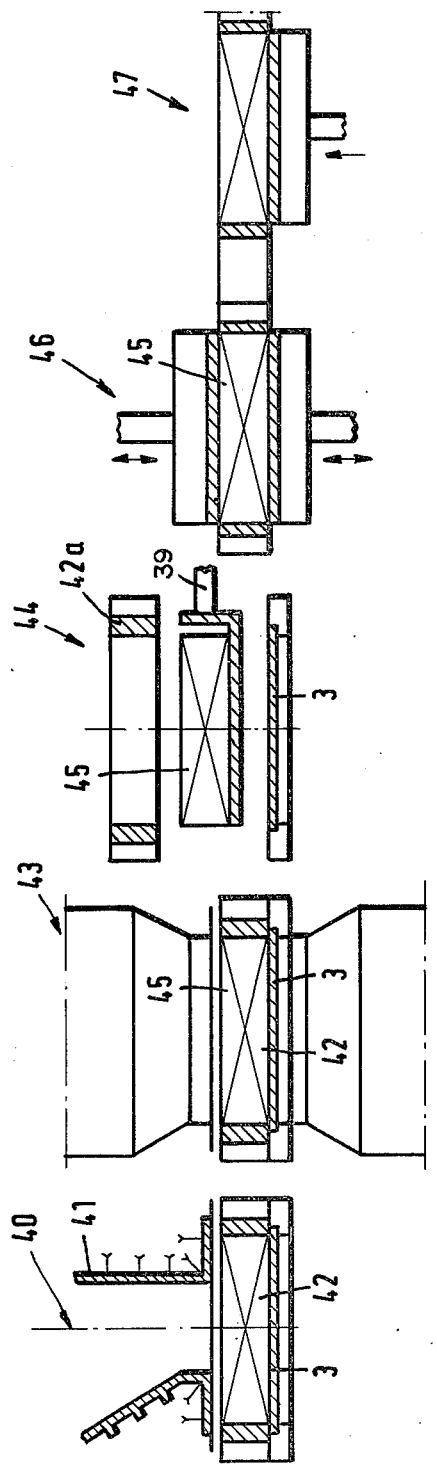

FIG. 7 shows another arrangement for forming and firing bodies, but which operates discontinuously rather than continuously as shown in FIG. 6. Here the material is loaded at a station 40 through a funnel 41 into a mold 42 having a base 3 and corresponding generally to the structure shown in FIGS. 1 and 4. Subsequently the mold 42 is positioned at a firing station 43 between burning chambers as described with respect to FIG. 6 so that the body 45 in the mold 42 is heated sufficiently to at least partially fuse, sinter, or coalesce the granules thereof together.

Subsequently a lifter 39 at a station 44 separates the upper portion 42a of the mold 42 from the floor 3 thereof.

The fired body 45 is then treated at a station 46 in the same manner as at the station 30 in FIG. 6 and is thereafter cooled at a station 47. Due to the inherent inability of the material of the body 45 to adhere to the surfaces of the mold 42 which it contacts, demolding of the body 45 is a very simple task.

It is noted that the clips 4 could be replaced by an adhesive bonding of the lining to the outer portion of the side wall of the mold. In such case it will be necessary to use an adhesive having good temperature-resistant qualities.

We claim:

1. A mold for firing bodies of particles of silica- or alumina-containing material, said mold comprising:
    a side wall; and
    a floor having an upper surface consisting of ferrochromite, magnesiochromite, calciochromite, or trivalent-chromium oxide.

2. The mold defined in claim 1 wherein said floor consists entirely of ferrochromite, magnesiochromite, calciochromite, or trivalent-chromium oxide and is foraminous.

3. The mold defined in claim 2 wherein said floor is formed of a plurality of parallel spaced bars.

4. The mold defined in claim 1 wherein the mold has a lining consisting of ferrochromite, magnesiochromite, calciochromite, or trivalent-chromium oxide, said mold further comprising a layer of insulating material between said side wall and said lining.

5. The mold defined in claim 4 wherein said insulating material is a mat of aluminum silicate fibers.

6. The mold defined in claim 4 wherein said side wall is at least partially spaced from and forms an empty cooling space with said lining.

7. The mold defined in claim 4, further comprising clips consisting of ferrochromite, magnesiochromite, calciochromite, or trivalent-chromium oxide securing said lining to said side wall.

8. The mold defined in claim 1 wherein said floor is perforated.